(12) United States Patent
Eguchi (10) Patent No.: US 6,647,064 B1
(45) Date of Patent: Nov. 11, 2003

(54) ADPCM ENCODING APPARATUS, ADPCM DECODING APPARATUS AND DELAY CIRCUIT

(75) Inventor: Hiroyuki Eguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/238,913

(22) Filed: Jan. 28, 1999

(30) Foreign Application Priority Data

Jan. 29, 1998 (JP) .......................................... P10-017498

(51) Int. Cl.[7] .............................................. H03K 13/24
(52) U.S. Cl. ........................................................ 375/245
(58) Field of Search .............................. 375/244, 245, 375/240, 242; 704/230, 212, 219; 341/51; 345/404, 405, 409, 410, 411; 369/17, 47, 48, 49, 50

(56) References Cited

U.S. PATENT DOCUMENTS

| | | | |
|---|---|---|---|
| 4,518,950 A | * | 5/1985 | Petr .................... 340/347 DD |
| 4,592,070 A | * | 5/1986 | Chow et al. .................. 375/27 |
| 4,860,315 A | | 8/1989 | Hosoda et al. ................. 375/30 |
| 5,089,818 A | * | 2/1992 | Mahieux et al. ............... 341/76 |
| 5,511,095 A | * | 4/1996 | Inoue et al. ................. 375/244 |
| 5,563,861 A | * | 10/1996 | Kudo et al. .................... 369/54 |
| 5,621,760 A | * | 4/1997 | Gotoh et al. ................. 375/245 |
| 5,715,366 A | * | 2/1998 | Mucke et al. ............... 395/2.39 |
| 6,138,090 A | * | 10/2000 | Inoue .......................... 704/212 |
| 6,301,428 B1 | * | 10/2001 | Linzer .......................... 386/52 |

FOREIGN PATENT DOCUMENTS

| | | | | |
|---|---|---|---|---|
| DE | WO 97/04621 A1 | * | 2/1997 | ............. H04S/3/00 |
| JP | 03-265309 | | 11/1991 | |
| JP | 04-087422 | | 3/1992 | |
| JP | 07-87422 | | 3/1995 | |

\* cited by examiner

*Primary Examiner*—Tesfaldet Bocure
*Assistant Examiner*—Dung X Nguyen
(74) *Attorney, Agent, or Firm*—Oblon, Spivak, McClelland, Maier & Neustadt, P.C.

(57) ABSTRACT

An improved ADPCM encoding and decoding apparatus for compressing and de-compressing a differential signal between an input digital signal and a predicted value of said digitized input in accordance with adaptive differential pulse code modulation is described. The apparatus includes a prediction unit for receiving the previous differential signal and performs the prediction in accordance with one of a plurality of different algorithms which is selected by referring to the previous differential signal.

12 Claims, 8 Drawing Sheets

ADPCM ENCODING APPARATUS, ADPCM DECODING APPARATUS AND DELAY CIRCUIT

BACKGROUND OF THE INVENTION

1. Field of the Invention

The present invention relates to the technique of ADPCM (adaptive differential pulse code modulation). More particularly, the present invention relates to an ADPCM encoding apparatus, an ADPCM decoding apparatus and a delay circuit used in an echo generation system for a "Karaoke" sing-along system.

2. Prior Art

In the recent years, a plurality of prediction units are operated at the same time for suppressing the prediction error in ADPCM systems by comparing respective prediction errors and switching one from another.

However, in the case of such a conventional system, the calculation of the prediction errors of a plurality of prediction units and the comparison of those prediction errors require an increased number of logic circuits. In addition to this, the compression efficiency tends to decrease due to information to be saved in the compressed data for appropriate switching the plurality of the prediction units. Accordingly, such a system is not suitable for use in compact devices such as an echo generation system for a "Karaoke" sing-along system, a shock-proof mechanism in a small portable audio device and so on.

SUMMARY OF THE INVENTION

The present invention has been made in order to solve the shortcomings as described above. It is an important object of the present invention to provide an ADPCM encoding apparatus, an ADPCM decoding apparatus and a delay circuit with compact circuit designs.

It is another important object of the present invention to provide an ADPCM encoding apparatus, an ADPCM decoding apparatus and a delay circuit without deteriorating the quality of the compressed data.

In brief, the above and other objects and advantages of the present invention are provided by a new and improved ADPCM encoding apparatus for compressing a differential signal between an input digital signal and a predicted value of the digitized input by encoding the differential signal in accordance with adaptive differential pulse code modulation. The ADPCM encoding apparatus comprises a prediction unit for outputting the predicted value; a subtractor for outputting the differential signal between the predicted value as outputted from the prediction unit and the input digital signal; an adaptive quantizer unit for quantizing the differential signal as outputted from the subtractor with a quantization step and outputting the quantized differential signal; a quantization step adjustment unit for updating the quantization step in accordance with the differential signal having been quantized by the adaptive quantizer unit; and an inverse quantizer connected to the adaptive quantizer unit and the quantization step adjustment unit for inversely quantizing the differential quantized signal outputted from the adaptive quantizer unit with the quantization step in order to output a decoded quantized differential signal, the prediction unit connected to the inverse quantizer for outputting a next value of the predicted value with reference to the decoded quantized differential signal, wherein the prediction unit is further connected to the adaptive quantizer and implemented with a plurality of algorithms for calculating the predicted value and performs the prediction in accordance with one of the algorithms which is selected by referring to the differential signal having been outputted from the adaptive quantizer unit.

In accordance with this configuration, the accuracy of the prediction unit is improved by the selective use of different prediction algorithms depending upon the state of the input signal, and as a result, it is possible to improve the quality of the compressed data as the output signal of the ADPCM encoding apparatus.

Also, in accordance with a preferred embodiment of the present invention, the one of the algorithms for calculating the predicted value is selected by referring to the differential signal which has been outputted from the adaptive quantizer unit one cycle before.

By this configuration, there is needed no information about the selection contained in the compressed data so that the compression efficiency is therefore improved.

Also, in accordance with a preferred embodiment of the present invention, the algorithms for calculating the predicted value includes a first algorithm and a second algorithm; the prediction unit is operated to output the predicted value which has been obtained one cycle before in accordance with the first algorithm; and the prediction unit is operated to output the predicted value which is obtained on the basis of extrapolation calculated with the predicted value which has been obtained one cycle before and the predicted value which has been obtained two cycles before in accordance with the second algorithm.

Also, since the configuration can be designed in a simple fashion, the ADPCM decoding apparatus can be implemented within a small area of a semiconductor chip and so on.

In accordance with a further aspect of the present invention, an ADPCM decoding apparatus for receiving a quantized differential signal as inputted and outputting a decoded output digital signal by inversely quantizing the quantized differential signal in accordance with adaptive differential pulse code modulation and obtaining the sum of a decoded quantized differential signal and a prediction value, the ADPCM decoding apparatus comprising: an inverse quantizer for receiving and inversely quantizing a quantized differential signal as inputted with the quantization step in order to output a decoded quantized differential signal; a quantization step adjustment unit connected to the inverse quantizer for updating the quantization step in accordance with quantized differential signal as inputted; a prediction unit for receiving the quantized differential signal as inputted, and calculating and outputting a predicted value of a decoded output digital signal; an adder connected to the inverse quantizer and the prediction unit for calculating the sum of the outputs of the inverse quantizer and the prediction unit, wherein the prediction unit is implemented with a plurality of algorithms for calculating the predicted value and performs the prediction in accordance with one of the algorithms which is selected by referring to the quantized differential signal as inputted.

In accordance with this configuration, the accuracy of the prediction unit is improved by the selective use of different prediction algorithms depending upon the environment, and as a result, it is possible to improve the quality of the compressed data as the output signal of the ADPCM decoding apparatus.

Also, in accordance with a preferred embodiment of the present invention, the one of the algorithms for calculating the predicted value is selected by referring to the differential signal which has been outputted from the adaptive quantizer unit one cycle before.

By this configuration, there is needed no information about the selection contained in the compressed data so that the compression efficiency is therefore improved.

Also, in accordance with a preferred embodiment of the present invention, the algorithms for calculating the predicted value includes a first algorithm and a second algorithm; the prediction unit is operated to output the predicted value which has been obtained one cycle before in accordance with the first algorithm; and the prediction unit is operated to output the predicted value which is obtained on the basis of extrapolation calculated with the predicted value which has been obtained one cycle before and the predicted value which has been obtained two cycles before in accordance with the second algorithm.

Also, since the configuration can be designed in a simple fashion, the ADPCM decoding apparatus can be implemented within a small area of a semiconductor chip and so on.

In accordance with a further aspect of the present invention, a signal delay circuit comprises an analog-digital converter for receiving and converting voice signals as inputted into digitized signals; an ADPCM encoding apparatus connected to the analog-digital converter for compressing the digitized signals into encoded signals by quantizing the digitized signals in accordance with adaptive differential pulse code modulation; a RAM connected to the ADPCM encoding apparatus for temporarily storing the encoded signals; an ADPCM decoding apparatus connected to the RAM for expanding the encoded signals into the digitized signals by inversely quantizing the compressed signal; a digital-analog converter connected to the ADPCM decoding apparatus for converting the digitized signals to the analog output of the voice signals; and a control device connected to the ADPCM encoding apparatus and the ADPCM decoding apparatus for maintaining agreement of the internal variables of the ADPCM encoding apparatus and the ADPCM decoding apparatus.

By this configuration, the correspondence between the ADPCM encoding apparatus and the ADPCM decoding apparatus is periodically maintained so that the operation of the signal delay can be guaranteed.

Also, in accordance with a preferred embodiment of the present invention, the signal delay circuit further comprises a low-pass filter connected to the analog-digital converter for removing the high frequency component of the analog input of voice signals.

By this configuration, it is possible to prevent the voice analog signals from aliasing at the analog-digital converter 12 and to avoid overload upon the ADPCM encoding apparatus 13 due to excessive variation of the signal level.

Also, in accordance with a preferred embodiment of the present invention, the signal delay circuit further comprises a low-pass filter connected to the digital-analog converter 16 for removing the high frequency component of the analog output of the voice signals.

By this configuration, it is possible to remove the high frequency component of the quantization noise mixed with the voice signals as quantized.

Also, in accordance with a preferred embodiment of the present invention, the control device comprises a register for storing the internal variable of the ADPCM encoding apparatus and a transfer device for transferring the contents of the register to the ADPCM decoding apparatus.

By this configuration, the actual implementation of the control device is given.

Also, in accordance with a preferred embodiment of the present invention, the control device is operated to store the internal variable of the ADPCM encoding apparatus and transfer the contents of the register to the ADPCM decoding apparatus with a time interval of the delay time of the echo effect of the echo generation system.

By this configuration, the correspondence between the inside variables of the ADPCM encoding apparatus and the ADPCM decoding apparatus is periodically maintained so that proper operation of the signal delay can be guaranteed.

Also, in accordance with a preferred embodiment of the present invention, the signal delay circuit as claimed in claim 7 wherein the signal delay circuit is implemented in an echo generation system for a "Karaoke" sing-along system.

By this configuration, the actual application of the delay circuit device is proposed.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 5(A) is a schematic diagram showing the operation of the prediction unit in accordance with the present invention.

DETAILED DESCRIPTION OF EMBODIMENTS

Several examples of preferred embodiments of the present invention will be explained in details with reference to the drawings in the followings.

Figure 1:
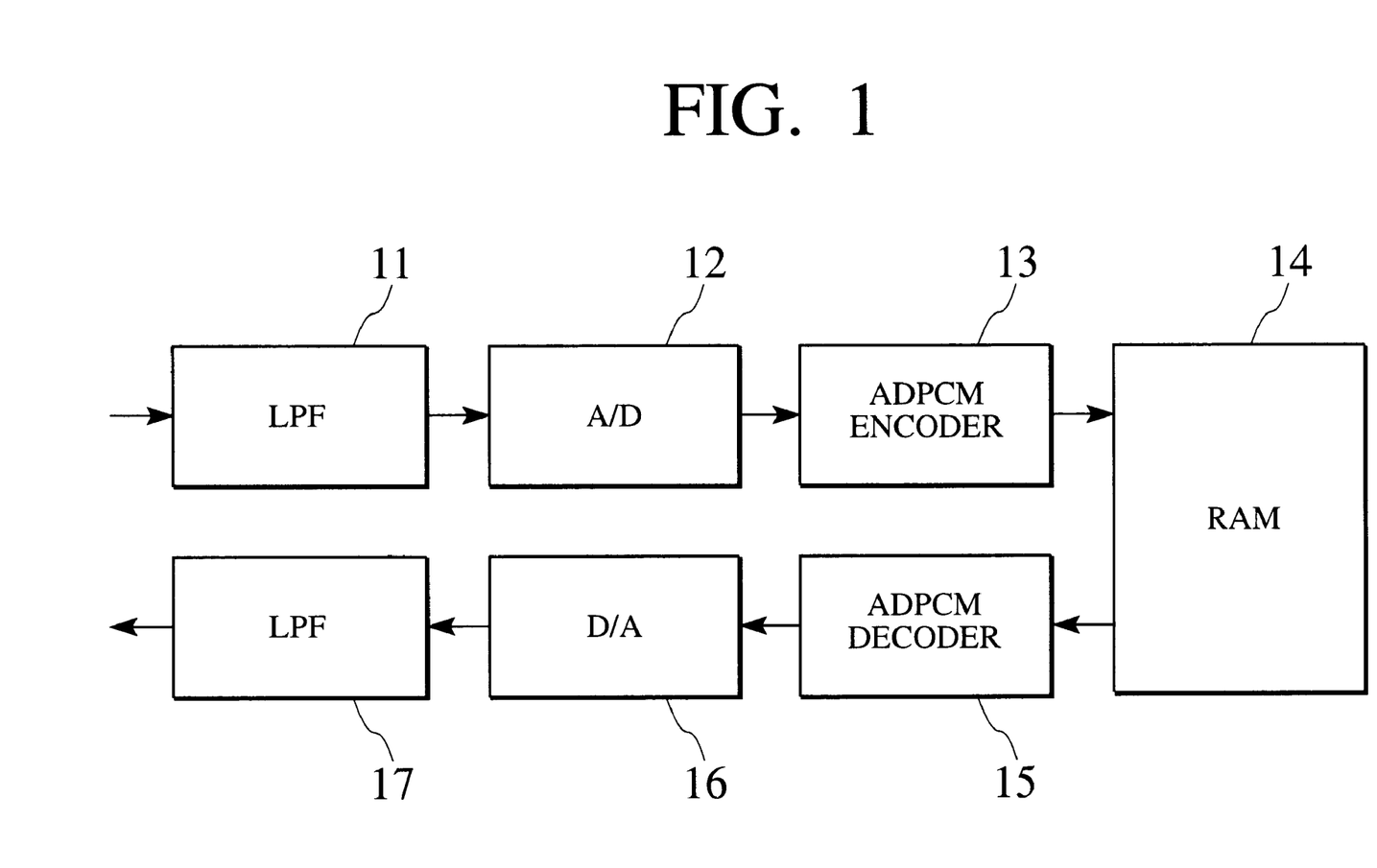
FIG. 1 is a block diagram showing an echo generation system for a "Karaoke" sing-along system provided with an ADPCM encoding apparatus and an ADPCM decoding apparatus in accordance with a first embodiment of the present invention.

FIG. 1 is a block diagram showing an echo generation system for a "Karaoke" sing-along system provided with an ADPCM encoding apparatus and an ADPCM decoding apparatus in accordance with a first embodiment of the present invention.

Namely, the echo generation system is composed of a low-pass filter 11 for removing the high frequency component of the analog input of voice signals, an analog-digital converter 12 connected to the low-pass filter 11 for converting the voice signals outputted from the low-pass filter 11 into digitized signals of 12 bits, an ADPCM encoding apparatus 13 connected to the analog-digital converter 12 for compressing the digitized signals of 12 bits into encoded signals of 4 bits by quantizing the digitized signals in accordance with the adaptive differential pulse code modulation, a RAM 14 connected to the ADPCM encoding apparatus 13 for temporarily storing the encoded signals of 4 bits, an ADPCM decoding apparatus 15 connected to the RAM 14 for expanding the encoded signals of 4 bits into the digitized signals of 12 bits by inversely quantizing the compressed signal, a digital-analog converter 16 connected to the ADPCM decoding apparatus 15 for converting the digitized signals of 12 bits to the analog output of the voice signals, and a low-pass filter 17 connected to the digital-analog converter 16 for removing the high frequency component of the analog output of the voice signals.

The specific data length of digital data as explained in the description is, of course, only one of possible cases so that, in the actual implementations, appropriate data lengths will be employed in accordance with the requirements of the applications. The description of the embodiments of the present invention is independent of the specific data length.

The low-pass filter 11 is provided for the purpose of preventing the voice analog signals from aliasing at the analog-digital converter 12 and avoiding overload upon the ADPCM encoding apparatus 13 due to excessive variation of the signal level. On the other hand, the low-pass filter 17 is provided for the purpose of removing the high frequency component of the quantization noise mixed with the voice signals as quantized.

Figure 2:
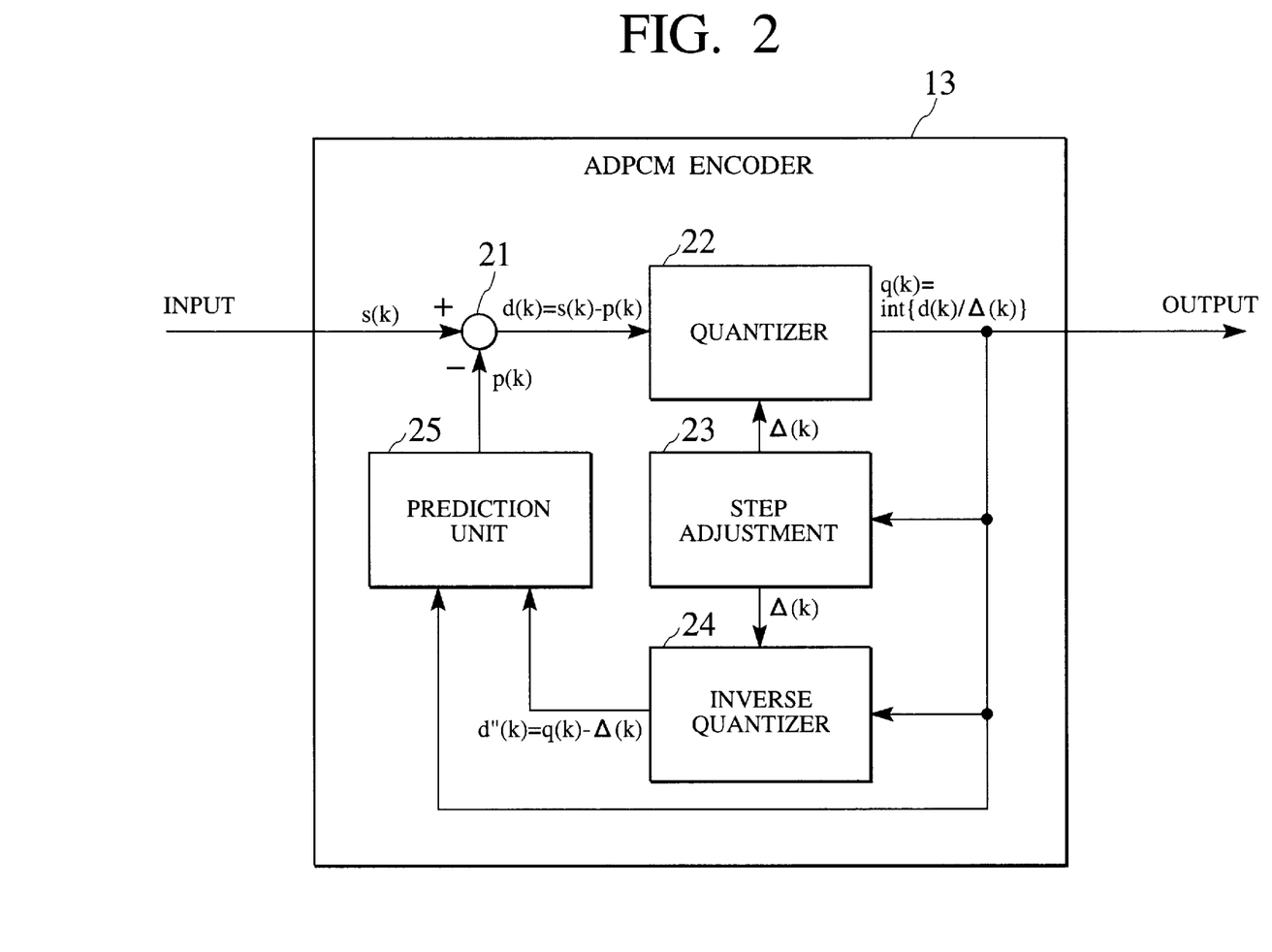
FIG. 2 is a block diagram showing an exemplary detailed configuration of the ADPCM encoding apparatus as illustrated in FIG. 1.

FIG. 2 is a block diagram showing an exemplary detailed configuration of the ADPCM encoding apparatus 13 as illustrated in FIG. 1.

The ADPCM encoding apparatus serves to compress a differential signal between an input digital signal and a predicted value of the digitized input by encoding the differential signal in accordance with adaptive differential pulse code modulation, and is provided with a prediction unit 25 for outputting a predicted value, a subtractor 21 for outputting the differential signal between the predicted value as outputted from the prediction unit and the input digital signal, an adaptive quantizer unit 22 for quantizing the differential signal as outputted from the subtractor 21 with a quantization step and outputting the quantized differential signal, a quantization step adjustment unit 23 for updating the quantization step in accordance with the differential signal having been quantized by the adaptive quantizer unit 22, and an inverse quantizer 24 connected to the adaptive quantizer unit 22 and the quantization step adjustment unit 23 for inversely quantizing the differential quantized signal outputted from the adaptive quantizer unit 22 with said quantization step in order to output a decoded quantized differential signal.

The prediction unit 25 is connected to the inverse quantizer 24 for outputting a next value of the predicted value with reference to the decoded quantized differential signal. Particularly, the prediction unit 25 is further connected to the adaptive quantizer 22 and implemented with a plurality of algorithms for calculating the predicted values and output one of the prediction results in accordance with one of the algorithms which is selected by referring to the previous differential signal having been outputted from the adaptive quantizer unit 22.

Next, the operation of this embodiment of the present invention will be explained with reference to FIG. 1 in details as follows. Analog signals such as voice signals are passed through the low-pass filter 11, converted into digitized signals of 12 bits by means of the analog-digital converter 12, quickly converted into compressed signals of 4 bits by means of the ADPCM encoding apparatus 13 and stored in the RAM 14. On the other hand, the compressed signals of 4 bits as stored in the RAM 14 is expanded to digitized signals of 12 bits by means of the ADPCM decoding apparatus 15, converted into analog signals by means of the digital-analog converter 16 and is outputted to an external device through the low-pass filter 17.

Hereinafter, the operation of the ADPCM encoding apparatus 13 will be explained with reference to FIG. 2.

The ADPCM encoding apparatus performs prediction on the basis of a first algorithm and a second algorithm. The prediction unit 25 is operated to output the predicted value which has been obtained one cycle before in accordance with said first algorithm and to output the predicted value which is obtained on the basis of extrapolation calculated with the predicted value which has been obtained one cycle before and the predicted value which has been obtained two cycles before in accordance with said second algorithm. More specifically described, there are provided in the prediction unit 25 the following two predicted value candidates of the predicted value p(k) which are switched with respect to the compressed data q(k−1) obtained one cycle before.

$$p''(k-1) \qquad (1)$$

$$2p''(k-1)-p''(k-2) \qquad (2)$$

The first formula is used to provide the previous sample, i.e., the output p''(k−1) of the ADPCM encoding apparatus 13 as the prediction value while the second formula is used to provide another prediction value of 2p''(k−1)−p''(k−2) calculated in accordance with linear extrapolation with the predicted value which has been obtained one cycle before and the predicted value which has been obtained two cycles before. Namely, in the case that the compressed data q(k−1) obtained one cycle before is the maximum value of "0111" or the minimum value of "1000" in terms of ones complement, 2p''(k−1)−p''(k−2) is outputted from the prediction unit 25 as the prediction value, while p''(k−1) is otherwise outputted from the prediction unit 25. The quantization step is updated in the quantization step adjustment unit 23 by making use of a multiplication factor selected in accordance with the compressed data.

Next, the operation of this embodiment of the present invention will be explained with reference to FIG. 2 in details as follows. The differential signal, d(k)=s(k)−p(k), between the input digitized signal s(k) and the output signal of p(k) of the prediction unit 25 is calculated in the subtractor 21 at time k, and is outputted to the adaptive quantizer unit 22. The differential signal d(k) is quantized by the adaptive quantizer unit 22 with the quantization step Δ(k) which is outputted from the quantization step adjustment unit 23. An appropriate coefficient α is selected by the quantization step adjustment unit 23 in accordance with the output signal q(k) of the adaptive quantizer unit 22. The quantization step $\Delta(k)$ is then updated for next quantization at time (k+1) as $\Delta(k+1)=\Delta(k)\times\alpha\{q(k)\}$. The inverse quantizer 24 calculate d"(k), which is the decoded signal of the differential signal d(k) as $d"(k)=\Delta(k)\times q(k)$, with the output signal of q(k) of the adaptive quantizer unit 22 and the quantization step $\Delta(k)$ which has been used for the quantization of the output signal of q(k).

The prediction unit 25 selects one of the plurality of the prediction values with reference to the output signal of q(k−1) of the adaptive quantizer unit 22 obtained one cycle before, and output the selected one as the prediction value p(k). In the next cycle, the prediction value p(k) is updated as p"(k)=p(k)+d"(k) after receiving the differential signal d"(k) from the inverse quantizer 24.

Figure 3:
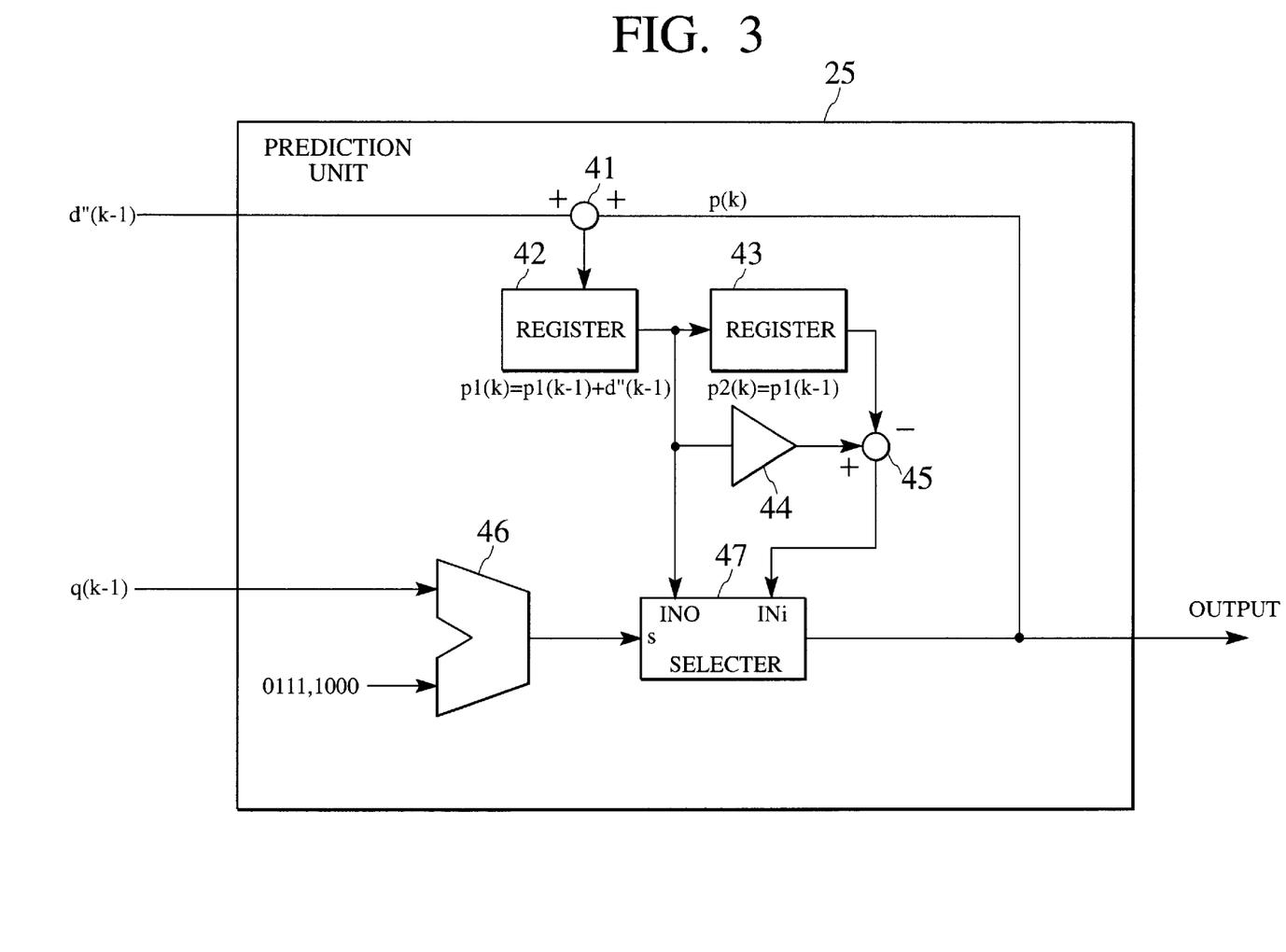
FIG. 3 is a schematic diagram showing an exemplary configuration of the prediction unit 25 as illustrated in FIG. 2.

FIG. 3 is a schematic diagram showing an exemplary configuration of the prediction unit 25 as illustrated in FIG. 2. The differential signal d"(k−1) and the output signal of p(k−1) of the prediction unit 25 both obtained one cycle before are added to each other by means of the adder 41 at time k followed by calculating the previous prediction value p1(k) as p1(k)=p(k−1)+d"(k−1) and storing the same in the register 42. The content of the register 42 is transferred to the register 43 in advance of updating the same. Accordingly, the prediction value obtained two cycle before is stored in the register 43 while the prediction value obtained one cycle before is stored in the register 42. The multiplexer 44 multiplies the content of the register 42 by two and output the same to the adder 45. The adder 45 adds the content of the register 43 to the output signal of the multiplexer 44 and output the same to one input terminal IN1 of the selector circuit 47. The other input terminal IN0 of the selector circuit 47 receives the content of the register 42.

The comparator 46 outputs "1" to the S terminal of the selector circuit 47 in the case that the encoded value q(k−1) is equal to "0111" or equal to "1000", and outputs "0" to the S terminal of the selector circuit 47 in the case that the encoded value q(k−1) is equal to either of "0111" and "1000". By this configuration, when the signal "1" is input to the S terminal of the selector circuit 47, the input digital signal to the IN1 terminal, i.e., 2p"(k−1)−p"(K−2) is selected and outputted, while when the signal "0" is input to the S terminal, the input digital signal to the IN0 terminal, i.e., p"(k−1) is selected and outputted as the output signal of the prediction unit 25.

Figure 4:
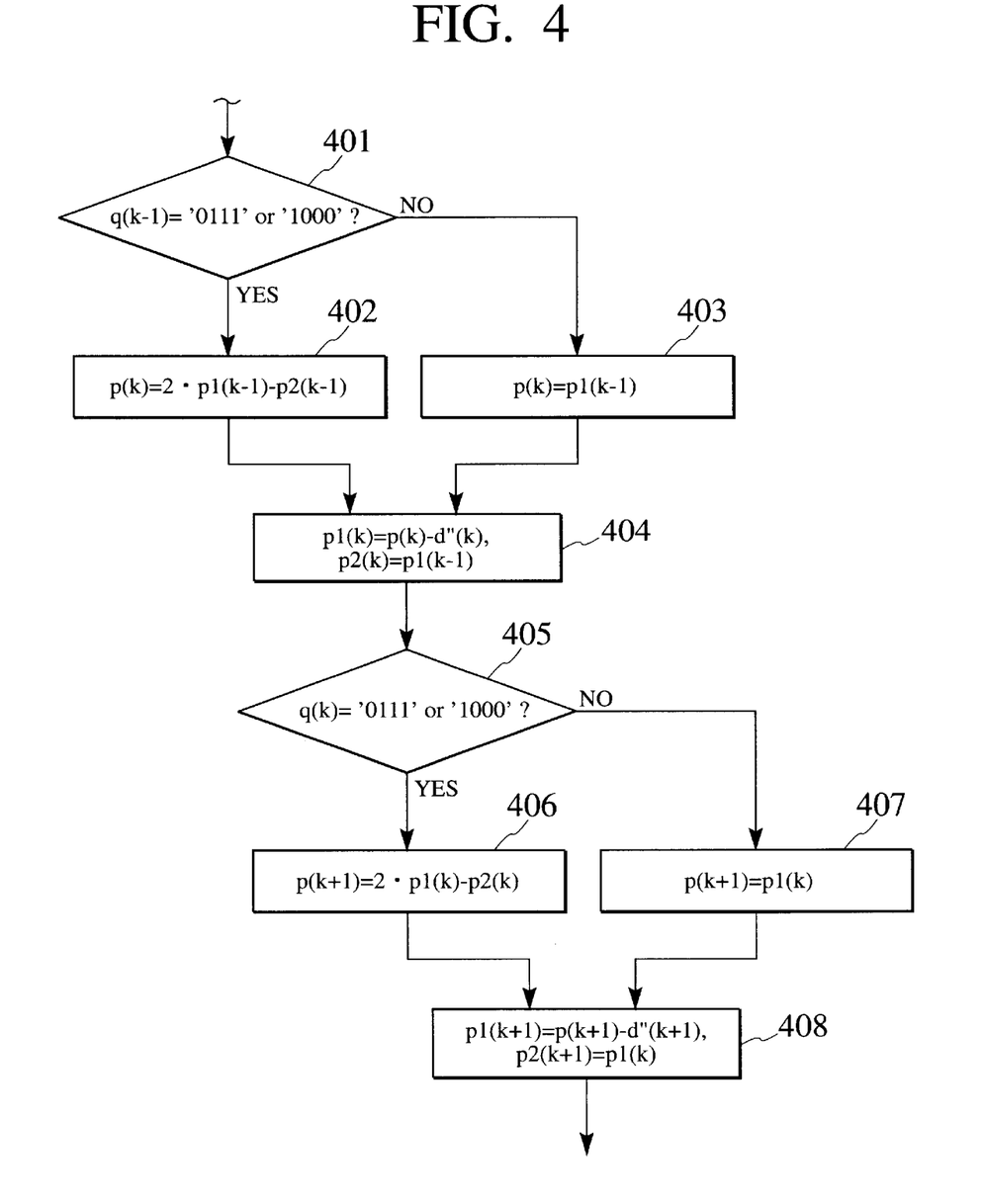
FIG. 4 is a flowchart showing the algorithm of the operation of the prediction unit as illustrated in FIG. 3.

FIG. 4 is a flowchart showing the algorithm of the operation of the prediction unit 25. The prediction unit 25 judges if the signal q(k−1) obtained one cycle before as the decoded signal inputted from the inverse quantizer 24 is the maximum value or the minimum value. If the signal q(k−1) is either the maximum value or the minimum value, the operation is proceeded to the step 402, while the operation is otherwise proceeded to the step 403.

In the step 402, the prediction unit 25 outputs the signal 2p"(k−1)−p"(k−2) as the predicted value p(k) to the subtractor 21. On the other hand, in the step 403, the prediction unit 25 outputs the signal p"(k−1) as the predicted value p(k) to the subtractor 21. Thereafter, the prediction unit 25 transfers the contents of the register 42 to the register 43 and then stores the result of the addition by the adder 41 into the register 42 in order to update the contents of the registers. The operations of the steps 401 to 404 are repeated in the steps 405 to 408.

Figure 5A:
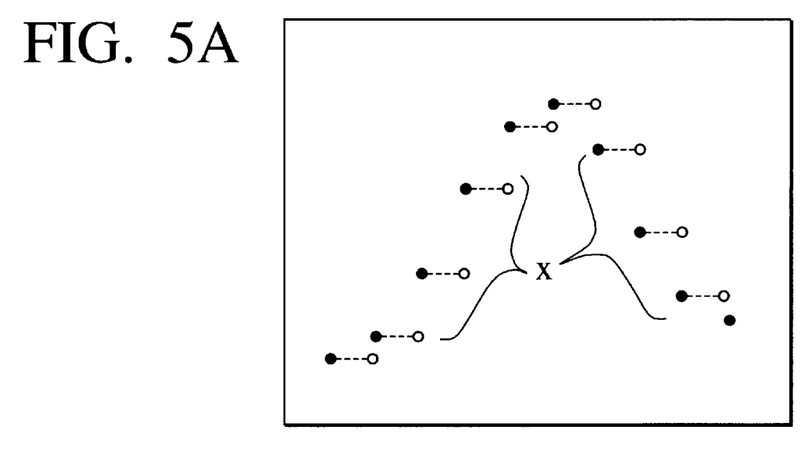
FIG. 5(A) is a schematic diagram showing the operation of the prediction unit as illustrated in FIG. 3 in the case that the prediction unit 25 is always operated to output the predicted value which has been obtained one cycle before.
Figure 5B:
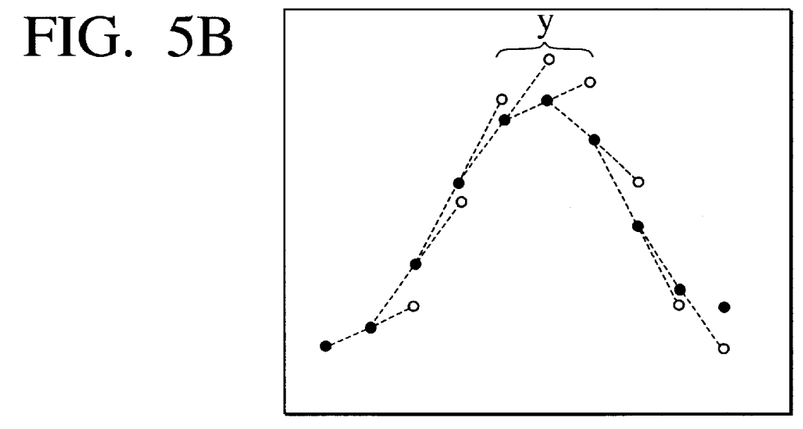
FIG. 5(B) is a schematic diagram showing the operation of the prediction unit as illustrated in FIG. 3.
Figure 5C:
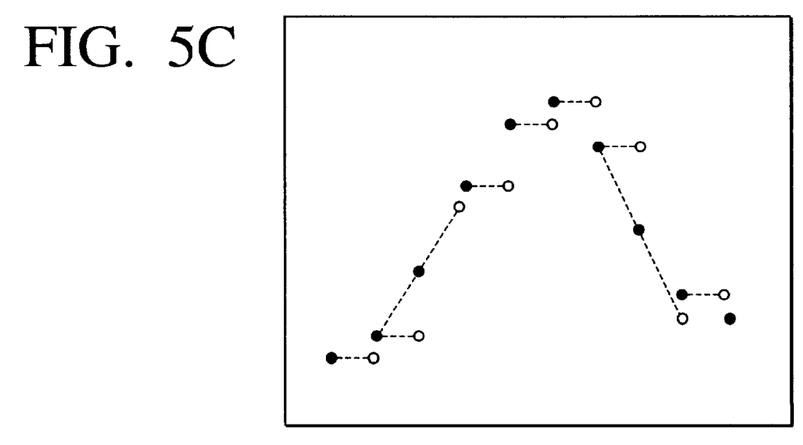

FIG. 5(A) to FIG. 5(C) are schematic diagrams showing the operation of the prediction unit 25. FIG. 5(A) is a schematic diagram showing the operation in the case that the prediction unit 25 is always operated to output the predicted value which has been obtained one cycle before; FIG. 5(B) is a schematic diagram showing the operation in the case that the prediction unit 25 is always operated to output the predicted value in accordance with linear; and FIG. 5(C) is a schematic diagram showing the operation in the case that the prediction unit 25 is selectively operated to output one of a plurality of the predicted values in accordance with this embodiment of the present invention.

In the case of FIG. 5(A), if there is a relatively long steep region, the quantization step tends to be undesirably expanded as illustrated. In the case of FIG. 5(B), if there is a point at which the gradient is sharply increased or decreased, the prediction error tends to be undesirably expanded as illustrated. Contrary to this, in the case of FIG. 5(C), if there is a relatively long steep region in which the signal variation can no longer be followed by the method as illustrated in FIG. 5(A), i.e., in the case that the encoded value q(k−1) is equal to either of the maximum value ("0111") and the minimum value of ("1000"), the prediction unit 25 outputs the signal 2p"(k−1)−p"(k−2) as the predicted value p(k) in order to suppress the prediction error. Accordingly, the method as illustrated in FIG. 5(C) is advantageous to suppress the prediction error with an improved signal variation following performance, as compared with the method as illustrated in FIG. 5(B).

In this case, while the linear extrapolation is employed with the maximum value ("0111") and the minimum value of ("1000") indicative of the signal variation which can no longer be followed, the output of the linear extrapolation, i.e, the signal 2p"(k−1)−p"(k−2) may often become effective for improving the quality of sound data as compressed by narrowing the quantization step. For example, when the encoded value q(k−1) is equal to either of "0111", "1000", "0110" and "1001", the prediction unit 25 can output the signal 2p"(k−1)−p"(k−2) as the predicted value p(k) in order to narrow the quantization step and improve the error correction performance.

Figure 6:
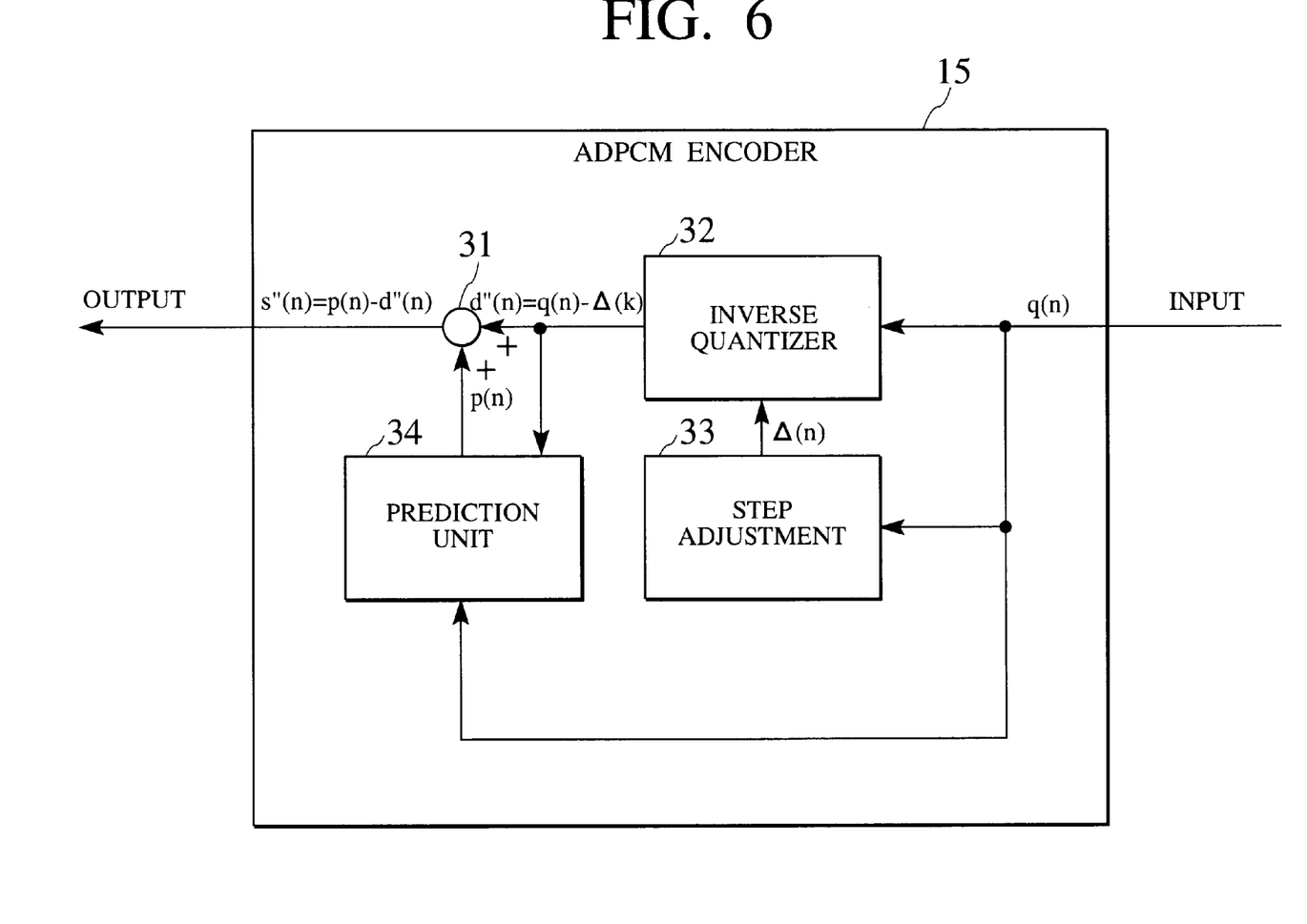
FIG. 6 is a block diagram showing an exemplary configuration of the ADPCM decoding apparatus as illustrated in FIG. 1.

FIG. 6 is a block diagram showing an exemplary configuration of the ADPCM decoding apparatus 15 as illustrated n FIG. 1. The inverse quantizer 32 decodes the differential encoded signal as $d"(n)=\Delta(n)\times q(n)$ with the quantization step $\Delta(n)$ outputted from the quantization step adjustment unit 33 and the input digital signal q(n) of the ADPCM decoding apparatus 15. The differential signal is outputted to the adder 31. The output signal d(n) of the inverse quantizer 32 and the output signal p(n) of the prediction unit 34 at time n are added to each other in the adder 31 and is outputted as the output signal of the ADPCM decoding apparatus 15.

On the other hand, an appropriate coefficient $\alpha\{q(n)\}$ is selected by the quantization step adjustment unit 23 in accordance with the input signal q(n). The quantization step $\Delta(n)$ is then updated for next de-quantization at time (n+1) as $\Delta(n+1)=\Delta(n)\times\alpha\{q(n)\}$. The prediction unit 34 selects one of the two prediction values with reference to the input signal q(n), and output the selected one as the prediction value p(n). In the next cycle, the prediction value p(n) is corrected as p"(n)=p(n)+d"(n) after receiving the differential signal d"(n) from the inverse quantizer 32.

The functions and operation of the prediction unit 34 in this embodiment of the present invention are equivalent to those as illustrated in FIG. 1 and the flowchart as illustrated in FIG. 4 so that detailed explanation is not repeated. By this configuration, in the case that the input data q(n) obtained one cycle before is the maximum value or the minimum value, 2p"(n−1)−p"(n−2) is outputted to the adder 31, while p"(n−1) is otherwise outputted.

In accordance with this embodiment of the present invention, the accuracy of the prediction units 25 and 34 is improved by the selective use of different prediction algorithms depending upon the state of the input signal, and as a result, it is possible to improve the quality of the compressed data as the output signal of the ADPCM encoding apparatus 13 and the decompressed data as the output signal of the ADPCM decoding apparatus 15. Furthermore, since the prediction algorithms are switched only with reference to the compressed data obtained one cycle before, there is needed no information about the selection contained in the compressed data. The compression efficiency is therefore improved. Also, since the configuration can be designed in a simple fashion, the ADPCM decoding and encoding apparatuses can be implemented within a small area of a semiconductor chip and so on.

Accordingly, a simplified echo generation system can be realized with the ADPCM encoding apparatus and the ADPCM decoding apparatus as described above. The data compression and de-compression by means of the ADPCM encoding apparatus and the ADPCM decoding apparatus are also effective for implementing a shock-proof mechanism in a small portable audio device without incurring much additional costs.

Furthermore, since the input analog signal is passed through the low-pass filter 11 in advance of the ADPCM encoding apparatus 13 in order to attenuate the high frequency component of the input analog signal, the maximum value of the differential level between adjacent samples can be suppressed to avoid to the best the case that the signal variation can no longer be followed by the adaptive differential pulse code modulation resulting in noise due to excessive loads and to suppress the quantization noise due to an expanded quantization step. Also, the scale of circuit complexity can be decreased without deteriorating the performance of the ADPCM encoding and decoding efficiency.

Meanwhile, the prediction units 25 and 34 and the quantization step adjustment units 23 and 33 of the ADPCM encoding apparatus 13 and the ADPCM decoding apparatus 15 have equivalent functions and therefore operates in the same manner with the same data. However, the agreement of the inside data of the ADPCM encoding apparatus 13 and the ADPCM decoding apparatus 15 may possibly be broken by external agitation. In this abnormal situation, the ADPCM decoding apparatus 15 can no longer reproduce the original data because of incorrect internal variables which are not in agreement with the corresponding variables having occurred in the ADPCM encoding apparatus 13.

Figure 7:
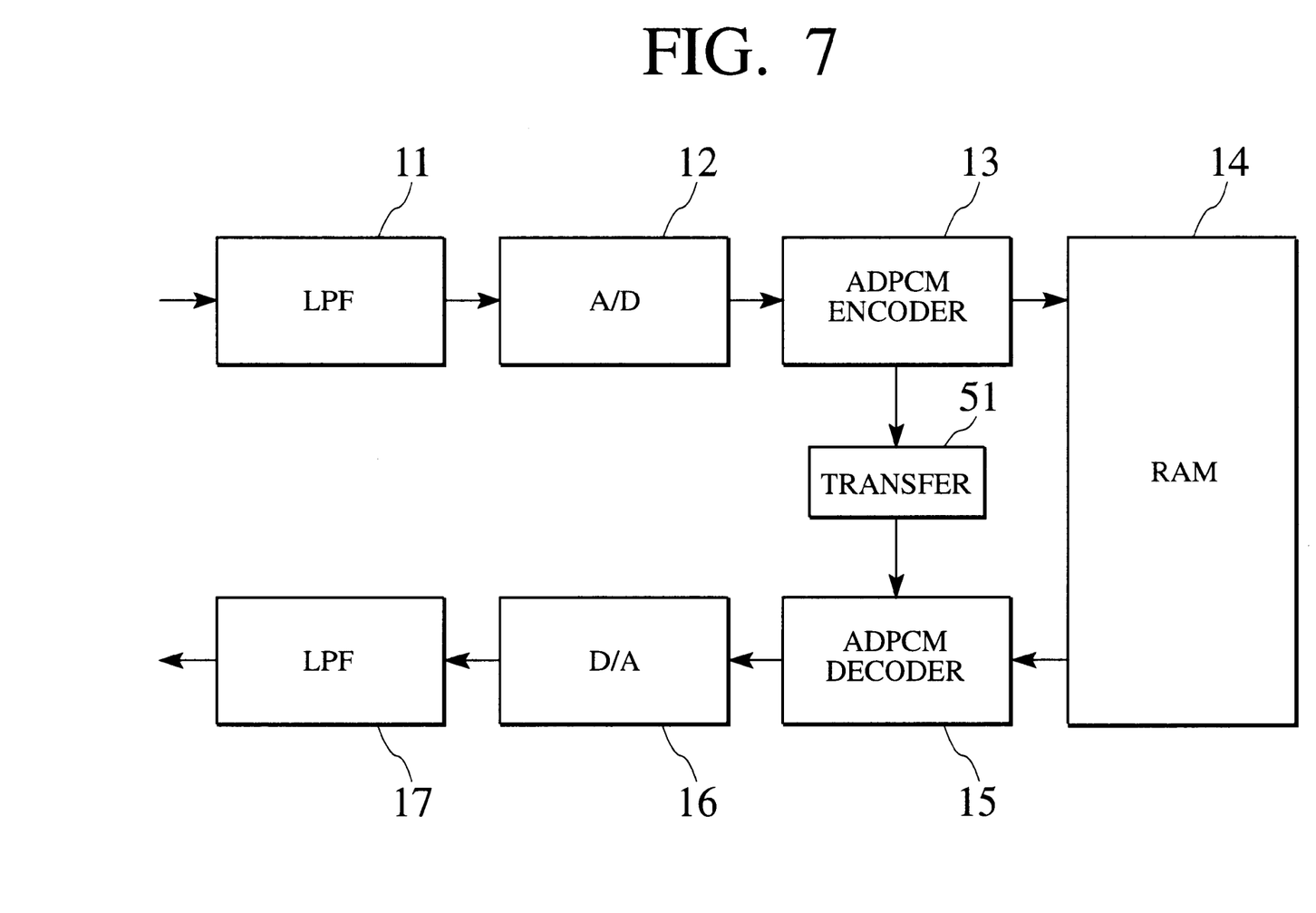
FIG. 7 is a block diagram showing an echo generation system for a "Karaoke" sing-along system provided with an ADPCM decoding apparatus and an ADPCM decoding apparatus in accordance with a second embodiment of the present invention.
Figure 8:
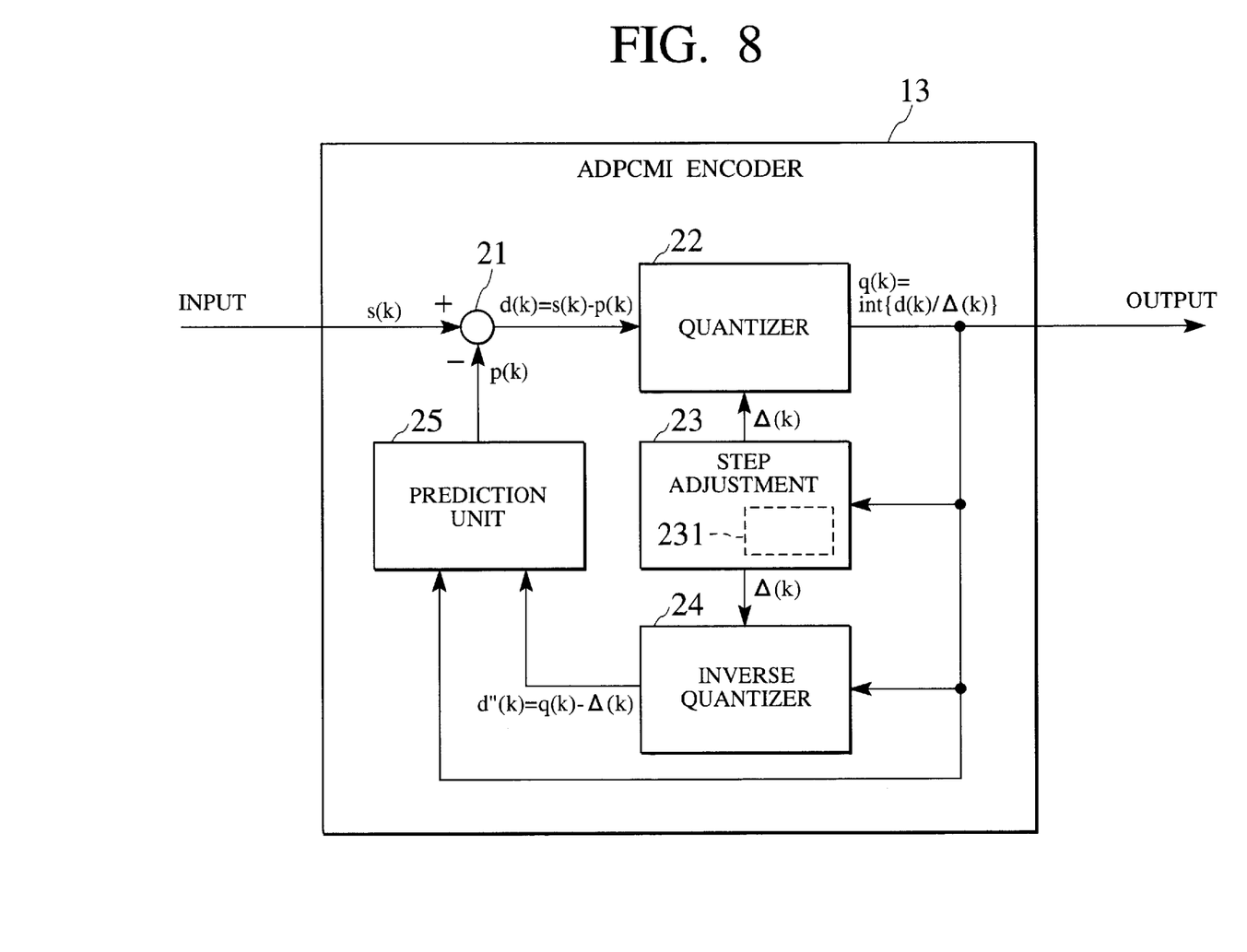
FIG. 8 is a block diagram showing an exemplary detailed configuration of the ADPCM encoding apparatus 13 as illustrated in FIG. 7.

FIG. 7 is a block diagram showing an echo generation system for a "Karaoke" sing-along system provided with an ADPCM encoding apparatus and an ADPCM decoding apparatus in accordance with a second embodiment of the present invention, in which the above shortcoming has been resolved. FIG. 8 is a block diagram showing an exemplary detailed configuration of the ADPCM encoding apparatus 13 as illustrated in FIG. 7. While the corresponding constituent elements have the same structures and functions of the previous embodiment, detailed explanation is not repeated.

The embodiment is provided further with a transfer control device 51 connected directly between the ADPCM encoding apparatus 13 and the ADPCM decoding apparatus 15. The transfer control device 51 serves to periodically save variable data under which the ADPCM encoding apparatus 13 operates and periodically restore the same data in the ADPCM decoding apparatus 15. The variable data includes the contents of the register 42 and the register 43 and the quantization step at that time.

More specifically speaking, as illustrated in FIG. 8, a register 231 having an appropriate width is provided in the quantization step adjustment unit 23 for temporarily saving the contents of the register 42 and the register 43 and the quantization step at that time repeatedly once per the delay time of the echo generation system. In synchronism with updating the register 231 once per the delay time of the echo generation, the contents of the register 42 and the register 43 and the quantization step as saved in the register 231 are transferred to the corresponding registers and the quantization step adjustment unit 33 of the ADPCM decoding apparatus 15. By this configuration, the proper correspondence between the inside variables of the ADPCM encoding apparatus 13 and the corresponding inside variables of the ADPCM decoding apparatus 15 can be maintained.

One of the most simple techniques for repeating operation of transferring and updating the contents of the register 231 and the quantization step is implemented by triggering the operation in synchronism with access to the top address (or predetermined particular address) of the RAM 14.

By this configuration, the correspondence between the ADPCM encoding apparatus 13 and the ADPCM decoding apparatus 15 is periodically maintained so that the operation of the signal delay can be guaranteed.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An ADPCM encoding apparatus configured to compress a differential signal between an input digital signal and a predicted value of said input digital signal by encoding said differential signal in accordance with adaptive differential pulse code modulation, said ADPCM encoding apparatus comprising:

a prediction unit configured to output said predicted value;

a subtractor configured to output said differential signal between said predicted value outputted from said prediction unit and said input digital signal;

an adaptive quantizer unit configured to quantize said differential signal outputted from said subtractor with a quantization step and outputting said quantized differential signal;

a quantization step adjustment unit configured to update said quantization step in accordance with said differential signal having been quantized by said adaptive quantizer unit; and an inverse quantizer connected to said adaptive quantizer unit and said quantization step adjustment unit configured to inversely quantize said quantized differential signal outputted from said adaptive quantizer unit with said quantization step to output a decoded quantized differential signal, said prediction unit being connected to said inverse quantizer and outputting a next value of said predicted value with reference to a reappeared quantized differential signal, wherein said prediction unit is implemented with a plurality of algorithms configured to calculate said predicted value and performs the prediction in accordance with one of said algorithms which is selected by referring to said differential signal having been outputted from said adaptive quantizer unit; and wherein said algorithms configured to calculate predicted values includes a first algorithm and a second algorithm;

said prediction unit is operated to output the predicted value which has been obtained one cycle before in accordance with said first algorithm; and said prediction unit is operated to output the predicted value which is obtained on the basis of extrapolation calculated with said predicted value which has been obtained one cycle before and said predicted value which has been obtained two cycles before in accordance with said second algorithm.

2. The ADPCM encoding apparatus as claimed in claim 1 wherein said second algorithm is selected if said quantized differential signal inputted one cycle before is equal to the maximum value or the minimum value, otherwise said first algorithm is selected.

3. The ADPCM encoding apparatus configured to compress a differential signal between an input digital signal and a predicted value of said input digital signal by encoding said differential signal in accordance with adaptive differential pulse code modulation, said ADPCM encoding apparatus comprising:

a prediction unit configured to output said predicted value;

a subtractor configured to output said differential signal between said predicted value outputted from said prediction unit and said input digital signal;

an adaptive quantizer unit configured to quantize said differential signal outputted from said subtractor with a quantization step and outputting said quantized differential signal;

a quantization step adjustment unit configured to update said quantization step in accordance with said differential signal having been quantized by said adaptive quantizer unit; and an inverse quantizer connected to said adaptive quantizer unit and said quantization step adjustment unit configured to inversely quantize said quantized differential signal outputted from said adaptive quantizer unit with said quantization step to output a decoded quantized differential signal, said prediction unit being connected to said inverse quantizer and outputting a next value of said predicted value with reference to a reappeared quantized differential signal, wherein said prediction unit is implemented with a plurality of algorithms configured to calculate said predicted value and performs the prediction in accordance with one of said algorithms which is selected by referring to said differential signal having been outputted from said adaptive quantizer unit; and wherein said prediction unit comprises:

a first adder configured to add, at time k, a differential signal d"(k−1) of one cycle before to an output signal p"(k−1) of one cycle before of said prediction unit and correcting said predicted value as p1(k)=p"(k−1)+d"(k−1);

a first register configured to store said corrected predicted value of one cycle before;

a second register configured to store a corrected predicted value of two cycles before;

a multiplier configured to double the content of said first register and to output the product;

a second adder configured to add the content of said second register to said product of said multiplier;

a selector having an input terminal IN1 configured to receive an output of said second adder and an input terminal IN0 configured to receive said content of said first register; and a comparator configured to compare an encoded value q(k−1) of one cycle before with "0111" and "1000", to output "1" to an S terminal of said selector if said encoded value q(k−1) is equal to one of "0111" and "1000", and to output "0" to said S terminal if said encoded value q(k−1) is equal to neither of "0111" and "1000", so that said selector may select and output a signal of 2p"(K−1)−p"(K−2) inputted to said terminal IN1 if "1" is inputted to said S terminal, and if "0" is inputted to said S terminal, a signal of p"(K−1) inputted to said terminal IN0.

4. An ADPCM decoding apparatus configured to receive a quantized differential signal inputted, to inversely quantize said quantized differential signal in accordance with adaptive differential pulse code modulation and to output a decoded output digital signal, said ADPCM decoding apparatus comprising:

an inverse quantizer configured to receive and to inversely quantize said quantized differential signal inputted with a quantization step to output a reappeared quantized differential signal;

a quantization step adjustment unit connected to said inverse quantizer configured to update said quantization step in accordance with said quantized differential signal as inputted;

a prediction unit configured to receive said quantized differential signal inputted, and to calculate and to output a predicted value of said decoded output digital signal;

an adder connected to said inverse quantizer and said prediction unit configured to calculate the sum of outputs of said inverse quantizer and said prediction unit, wherein said prediction unit is implemented with a plurality of algorithms configured to calculate said predicted value and performs the prediction in accordance with one of said algorithms which is selected by referring to said quantized differential signal as inputted.

5. The ADPCM decoding apparatus as claimed in claim 4 wherein said one of the algorithms configured to calculate said predicted value is selected by referring to said quantized differential signal as inputted one cycle before.

6. The ADPCM decoding apparatus as claimed in claim 4 wherein said algorithms configured to calculate predicted values includes a first algorithm and a second algorithm; said prediction unit is operated to output the predicted value which has been obtained one cycle before in accordance with said first algorithm; and said prediction unit is operated to output the predicted value which is obtained based on extrapolation calculated with said predicted value which has been obtained one cycle before and said predicted value which has been obtained two cycles before in accordance with said second algorithm.

7. The ADPCM decoding apparatus as claimed in claim 4 wherein said second algorithm is selected if said quantized differential signal inputted one cycle before is equal to the maximum value or the minimum value, otherwise said first algorithm is selected.

8. The ADPCM decoding apparatus as claimed in claim 4 wherein said prediction unit comprises:
- a first adder configured to add, at time k, a differential signal d"(k−1) of one cycle before to an output signal p"(k−1) of one cycle before of said prediction unit and correcting said predicted value as p1(k)=p"(k−1)+d"(k−1);
- a first register configured to store said corrected predicted value of one cycle before;
- a second register configured to store a corrected predicted value of two cycles before;
- a multiplier configured to double the content of said first register and to output the product;
- a second adder configured to add the content of said second register to said product of said multiplier;
- a selector having an input terminal IN1 configured to receive an output of said second adder and an input terminal IN0 configured to receive said content of said first register; and
- a comparator configured to compare an encoded value q(k−1) of one cycle before with "0111" and "1000", to output "1" to an S terminal of said selector if said encoded value q(k−1) is equal to one of "0111" and "1000", and to output "0" to said S terminal if said encoded value q(k−1) is equal to neither of "0111" and "1000", so that said selector may select and output a signal of 2p"(K−1)−p"(K−2) inputted to said terminal IN1 if "1" is inputted to said S terminal, and if "0" is inputted to said S terminal, a signal of p"(K−1) inputted to said terminal IN0.

9. An ADPCM encoding and decoding apparatus comprising:
- an ADPCM encoding apparatus configured to compress a differential signal between an input digital signal and a predicted value of said digitized input by encoding said differential signal in accordance with adaptive differential pulse code modulation;
- an ADPCM decoding apparatus configured to receive a quantized differential signal inputted, to inversely quantize said quantized differential signal in accordance with adaptive differential pulse code modulation and to output a decoded output digital signal; and
- a memory device connected between said ADPCM encoding apparatus and said ADPCM decoding apparatus configured to temporarily store an encoded signal;
- said ADPCM encoding apparatus comprising:
  - a first prediction unit configured to output said predicted value;
  - a subtractor configured to output said differential signal between said predicted value outputted from said prediction unit and said input digital signal;
  - a first adaptive quantizer unit configured to quantize said differential signal outputted from said subtractor with a quantization step and to output said quantized differential signal;
  - a first quantization step adjustment unit configured to update said quantization step in accordance with said differential signal having been quantized by said adaptive quantizer unit; and
  - a first inverse quantizer connected to said first adaptive quantizer unit and said first quantization step adjustment unit configured to inversely quantize said quantized differential signal outputted from said adaptive quantizer unit with said quantization step to output a decoded quantized differential signal, said prediction unit being connected to said inverse quantizer and outputting a next value of said predicted value with reference to a reappeared quantized differential signal,
  - wherein said first prediction unit is implemented with a plurality of algorithms configured to calculate predicted values and performs the prediction in accordance with one of said algorithms which is selected by referring to said differential signal having been outputted from said first adaptive quantizer unit;
- said ADPCM decoding apparatus comprising:
  - a second inverse quantizer configured to receive and to inversely quantize said quantized differential signal as inputted with a quantization step to output a reappeared quantized differential signal;
  - a second quantization step adjustment unit connected to said second inverse quantizer configured to update said quantization step in accordance with said quantized differential signal inputted;
  - a second prediction unit configured to receive said quantized differential signal as inputted, and to calculate and to output a predicted value of said decoded output digital signal;
  - an adder connected to said second inverse quantizer and said second prediction unit configured to calculate the sum of outputs of said second inverse quantizer and said second prediction unit,
  - wherein said second prediction unit is implemented with a plurality of algorithms configured to calculate predicted values and performs the prediction in accordance with one of said algorithms which is selected by referring to said quantized differential signal as inputted.

10. The ADPCM encoding and decoding apparatus as claimed in claim 9, further comprising:
- an analog-digital converter connected to said ADPCM encoding apparatus configured to receive and to convert an analog input signal into a digitized signal;
- a first low-pass filter connected to said analog-digital converter configured to remove the high frequency component of said analog input signal;
- a digital-analog converter connected to said ADPCM decoding apparatus configured to convert said digitized signal into an analog output signal; and
- a second low-pass filter connected to said digital-analog converter configured to remove the high frequency component of said analog output signal.

11. The ADPCM encoding and decoding apparatus as claimed in claim 10 wherein said analog input signal is a voice signal,
and said apparatus is implemented in an echo generation system for a "Karaoke" sing-along system.

12. A signal delay circuit comprising:
- an ADPCM encoding apparatus configured to compress a digitized signal into an encoded signal by quantizing said digitized signal in accordance with adaptive differential pulse code modulation;
- a first memory device connected to said ADPCM encoding apparatus and configured to temporarily store a first internal variable used in said ADPCM encoding apparatus;
- an ADPCM decoding apparatus connected to said memory device configured to expand said encoded signal into said digitized signal by inversely quantizing said encoded signal;
- a second memory device connected to said ADPCM decoding apparatus configured to temporarily store a second internal variable used in said ADPCM decoding apparatus;

a control device connected to said ADPCM encoding apparatus and said ADPCM decoding apparatus configured to maintain agreement of said first and second internal variables of said ADPCM encoding apparatus and said ADPCM decoding apparatus;

an analog-digital converter connected to said ADPCM encoding apparatus configured to receive and to convert an analog input signal into said digitized signal; and a digital-analog converter connected to said ADPCM decoding apparatus configured to convert said digitized signal into an analog output signal;

wherein said analog input signal is a voice signal, and said signal delay circuit is implemented in an echo generation system for a "Karaoke" sing-along system; and wherein said control device is operated to store said first internal variable of said ADPCM encoding apparatus and transfer a content of said first memory device to said ADPCM decoding apparatus with a time interval of delay time of an echo effect of said echo generation system.

* * * * *